(12) United States Patent
Lee

(10) Patent No.: US 8,587,935 B2
(45) Date of Patent: Nov. 19, 2013

(54) CONTAINER MEMBER, METHOD OF MANUFACTURING THE SAME, AND DISPLAY DEVICE HAVING THE SAME

(75) Inventor: Hyun-Hee Lee, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 300 days.

(21) Appl. No.: 12/888,901

(22) Filed: Sep. 23, 2010

(65) Prior Publication Data

US 2011/0116220 A1   May 19, 2011

(30) Foreign Application Priority Data

Nov. 17, 2009   (KR) .................. 10-2009-0110910

(51) Int. Cl.
*H05K 5/00* (2006.01)
*H05K 7/00* (2006.01)
*G06F 1/16* (2006.01)
*G02F 1/1333* (2006.01)

(52) U.S. Cl.
USPC ............ 361/679.02; 361/679.21; 361/679.26; 361/679.3; 361/649.56; 349/58

(58) Field of Classification Search
USPC ................ 361/679.02, 679.3, 679.56; 349/58
See application file for complete search history.

(56) References Cited

U.S. PATENT DOCUMENTS

| | | | |
|---|---|---|---|
| 7,423,704 B2 * | 9/2008 | Cho et al. ...................... | 349/58 |
| 7,495,738 B2 * | 2/2009 | Okuda ........................... | 349/150 |
| 7,586,556 B2 | 9/2009 | You et al. | |
| 7,679,694 B2 | 3/2010 | Shirai | |
| 7,847,879 B2 * | 12/2010 | Choi .............................. | 349/58 |
| 8,053,988 B2 * | 11/2011 | Kim .............................. | 313/585 |
| 2005/0280750 A1 * | 12/2005 | Cho et al. ..................... | 349/58 |
| 2006/0061859 A1 | 3/2006 | Chen et al. | |
| 2006/0109614 A1 | 5/2006 | Lee et al. | |
| 2006/0139959 A1 | 6/2006 | Bae et al. | |
| 2006/0152648 A1 * | 7/2006 | Kim et al. ..................... | 349/58 |
| 2007/0019275 A1 * | 1/2007 | Okuda .......................... | 359/265 |
| 2007/0216826 A1 | 9/2007 | Lee et al. | |
| 2008/0112116 A1 | 5/2008 | Kim | |
| 2008/0158470 A1 | 7/2008 | Chung et al. | |
| 2008/0239193 A1 | 10/2008 | Jang et al. | |
| 2008/0273138 A1 | 11/2008 | Lee | |
| 2008/0297680 A1 | 12/2008 | Hwang et al. | |
| 2009/0004408 A1 | 1/2009 | Nakanishi et al. | |

(Continued)

FOREIGN PATENT DOCUMENTS

CN   1744805   3/2006
CN   1920644   2/2007

(Continued)

*Primary Examiner* — Anthony Haughton
(74) *Attorney, Agent, or Firm* — Robert E. Bushnell, Esq.

(57) ABSTRACT

A display device that includes a display panel and a container member that accommodates the display panel, where the container member can effectively absorb an external impact to sufficiently protect the display panel from damage and minimize deformation caused by an external stress, a method of manufacturing the same. The container member includes a metal frame including a space that accommodates the display panel, a plurality of sides and a bottom having a first opening; and a mold frame arranged between the sides of the metal frame and sides of the display panel. The display device may also include a buffer tape within the first opening. The mold frame is preferably produced by an injection molding technique.

21 Claims, 4 Drawing Sheets

(56) References Cited

U.S. PATENT DOCUMENTS

| | | | |
|---|---|---|---|
| 2009/0103001 A1* | 4/2009 | Choi | 349/58 |
| 2009/0174827 A1 | 7/2009 | Kim et al. | |
| 2010/0101856 A1 | 4/2010 | Yee et al. | |

FOREIGN PATENT DOCUMENTS

| | | |
|---|---|---|
| CN | 201182045 | 1/2009 |
| EP | 0959488 A1 | 11/1999 |
| JP | 11007000 A | 1/1999 |
| JP | 2003330001 | 11/2003 |
| JP | 2003330377 | 11/2003 |
| JP | 2004354731 A | 12/2004 |
| JP | 2005084510 | 3/2005 |
| JP | 2006053532 | 2/2006 |
| JP | 2008152263 | 7/2008 |
| JP | 2009229822 | 10/2009 |
| KR | 1020060061058 A | 6/2006 |
| KR | 1020060101689 A | 9/2006 |
| KR | 1020070052082 A | 5/2007 |
| KR | 1020100045770 | 5/2010 |

* cited by examiner

CONTAINER MEMBER, METHOD OF MANUFACTURING THE SAME, AND DISPLAY DEVICE HAVING THE SAME

CLAIM OF PRIORITY

This application claims the benefit of Korean Patent Application No. 2009-0110910, filed Nov. 17, 2009, the disclosure of which is hereby incorporated herein by reference in its entirety.

BACKGROUND OF THE INVENTION

1. Field of the Invention

A container member for accommodating a display panel that can effectively absorb an external impact to sufficiently prevent the impact from reaching the display panel within while minimizing deformation caused by an external stress, a method of manufacturing the same, and a display device having the same.

2. Description of the Related Art

Display devices are generally sorted into cathode-ray tube display devices and flat panel display devices. Flat panel display devices have replaced cathode ray tube display devices due to their light weight and thin thickness. Typical examples of the flat panel display devices include liquid crystal display devices (LCDs) and organic light emitting diode display devices (OLEDs). In comparison with the LCDs, the OLEDs have excellent brightness and viewing angle characteristics and require no backlight, so that the OLEDs can be realized as ultra thin display devices. The OLEDs are display devices using a phenomenon that electrons and holes injected into an organic thin film from a cathode and an anode are recombined to form excitons, and thus light having a specific wavelength is emitted by the release of energy resulting from de-excitation of the excitons.

Particularly, flat panel display devices are frequently used for small portable display devices such as mobile phones, personal digital assistants (PDAs), and portable multimedia players (PMPs) in addition to large display devices such as televisions and monitors for computers. Since display panels used in the flat panel display devices to display a predetermined image are made of a fragile material such as glass, the display panels are accommodated in separate container members to protect the display panels from being damaged or deformed by external impact or stress such as drop impact. Such container members generally include a metal frame or a mold frame. The metal frame can prevent the display panel from being deformed by external stress owing to its high rigidity, however, the metal frame may damage the display panel in an assembly process upon external impact. To sufficiently absorb the external impact, the metal frame must be sufficiently thick, and thus its entire size is increased. In comparison with the metal frame, the mold frame facilitates the assembly process, and can minimize a size of the display device. However, due to lack of rigidity, the mold frame does not sufficiently prevent the display panel from being deformed by the external stress. What is therefore needed is a container for a display apparatus that is not too bulky, is less apt to damage the display apparatus during assembly and that adequately protects the display apparatus from damage due to external impact.

SUMMARY OF THE INVENTION

Aspects of the present invention provide a container member for accommodating a display panel, which can change its structure to prevent damage to the display panel in an assembly process, and effectively relieve an external impact to sufficiently prevent deformation caused by an external stress, a method of manufacturing the same, and a display device having the same.

According to one aspect of the present invention, there is provided a display device that includes a display panel and a container member, the container member includes a metal frame including a space that accommodates the display panel, a plurality of sides and a bottom having a first opening and a mold frame arranged between the sides of the metal frame and sides of the display panel. Each of the sides of the metal frame may include at least one fastening aperture, the mold frame may include a plurality of sides, each of the sides of the mold frame may include at least one first protrusion arranged at a location that corresponds to the fastening aperture. Each of the sides of the metal frame may include at least one step, the mold frame may include a plurality of sides, each of the sides of the mold frame may include at least one second protrusion arranged at a location that corresponds to the step. The metal frame may also include a plurality of rounded corners. Each of the corners may have a curvature. Each of the sides of the metal frame may have a hemmed structure. The mold frame may also include a bottom having a second opening having an area that corresponds to the first opening. The display device may also include a buffer tape arranged within the first opening of the metal frame.

According to another aspect of the present invention, there is provided a method of manufacturing a container member that accommodates a display panel, the method including providing a metal frame having a bottom and a plurality of sides, the bottom having a first opening and forming a mold frame on inner sides of the metal frame by injection molding. The method may also include forming at least one fastening aperture in each of the sides of the metal frame and forming at least one protrusion on each side of the mold frame at a location that corresponds to the fastening aperture during said injection molding. The method may also to include forming at least one step in each of the sides of the metal frame and forming at least one protrusion on each side of the mold frame at a location that corresponds to the step during said injection molding. The method may also include rounding corners of the metal frame prior to said formation of the mold frame. The method may also include producing a hemmed structure by folding the sides of the metal frame prior to said formation of the mold frame.

According to still another aspect of the present invention, there is provided a display device that includes a display panel to display an image, a metal frame including a space that accommodates the display panel, a plurality of sides and a bottom having a first opening, a mold frame arranged between the sides of the metal frame and sides of the display panel and a buffer tape arranged within the first opening of the metal frame. The metal frame may include at least one fastening aperture arranged in each of the sides, and the mold frame may include at least one first protrusion arranged on each side thereof to correspond to the fastening aperture. The metal frame may include at least one step arranged in each of the sides, and the mold frame may include at least one second protrusion arranged on each side thereof to correspond to the step. The metal frame may include rounded corners. The sides of the metal frame may have a hemmed structure. The mold frame may also include bottom having a second opening having an area corresponding to the first opening. The display device may also include a double-sided tape arranged between the display panel and the bottom of the metal frame.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
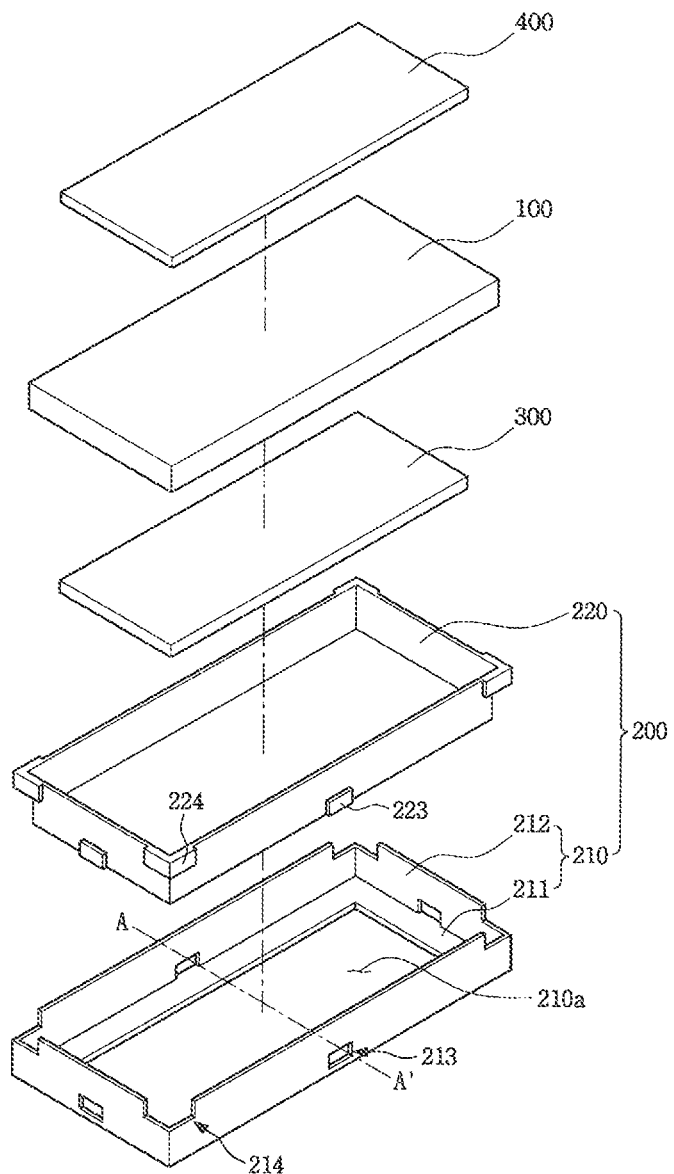
FIG. 1 is an exploded perspective view illustrating a display device according to a first embodiment of the present invention.

Reference will now be made in detail to the present embodiments, examples of which are shown in the accompanying drawings, wherein like reference numerals refer to the like elements throughout. In the drawings, the thicknesses of layers and regions may be exaggerated for clarity. The embodiments are described below in order to explain the present invention by referring to the figures.

First Embodiment

Figure 2A:
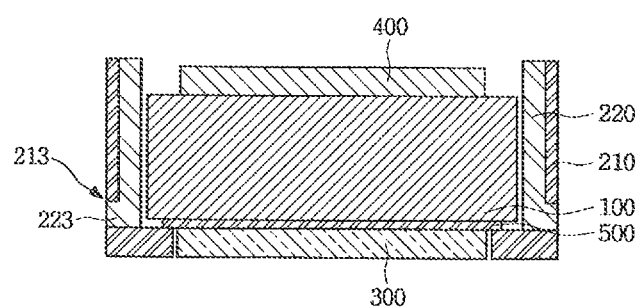
FIG. 2A is a cross-sectional view taken along line A-A' of FIG. 1.

Turning now to FIGS. 1 and 2A, FIG. 1 is an exploded perspective view illustrating a display device according to a first embodiment and FIG. 2A is a cross-sectional view taken along line A-A' of FIG. 1. Referring to FIGS. 1 and 2A, the display device according to a first embodiment includes a display panel 100 for displaying a predetermined image, a container member 200 including a metal frame 210 which provides a space for accommodating the display panel 100, metal frame 210 having a bottom 211 with a first opening 210a, a mold frame 220 located inside the metal frame 210, and buffer tape 300 located inside the first opening 210a of the metal frame 210. The display panel 100 may be an organic light emitting diode (OLED) display panel having OLEDs.

The display device according to a first embodiment may further include a polarizer 400 located on one side of the display panel 100 in order to improve a contrast ratio and luminance of an image displayed by the display panel 100, and a double-sided tape 500 interposed between the display panel 100 and the buffer tape 300 and between the display panel 100 and the bottom 211 of the metal frame 210 of the container member 200 in order to firmly maintain adhesion among the display panel 100, the container member 200, and the buffer tape 300.

In the container member 200 of the display device according to a first embodiment, the metal frame 210 serves to maintain a geometry of the container member 200, thereby preventing an external stress generated by an external impact such as a drop impact from being transmitted to the display panel 100. The mold frame 220 is interposed between sides 212 of the metal frame 210 and the display panel 100, and the degree of the impact on the sides 212 of the metal frame 210 is attenuated or eliminated by the mold frame 220, protecting the display panel 100 inside.

The container member 200 may include at least one first fastening hole 213 located in each side 212 of the metal frame 210 and at least one first protrusion 223 located on each side of the mold frame 220 at locations that correspond to the first fastening holes 213 such that the metal frame 210 may be firmly coupled to the mold frame 220. The container member 200 may also include at least one first step 214 located at each side 212 of the metal frame 210 and at least one second protrusion 224 located on each side of the mold frame 220 at locations that correspond to the first steps 214 to more firmly maintain a coupling force between the metal frame 210 and the mold frame 220. Specifically, the steps 214 of the metal frame 210 are located at corners of the metal frame 210 so that the metal frame 210 can be firmly coupled with the mold frame 220 regardless of a direction of the external impact applied to the metal frame 210.

In the display device according to a first embodiment, the container member 200 can be assembled by forming the metal and mold frames 210 and 220 separately and then coupling the metal and mold frames 210 and 220 together. When the metal and mold frames 210 and 220 are in close contact with each other, it is possible to more effectively protect the display panel 100 from impact and stress caused by the external impact such as a drop impact. To best form this close contact between the metal frame 210 and the mold frame 220, the metal frame 210 may first be produced, and then the mold frame 220 is formed inside the metal frame 210 by injection molding to complete assembly of the container member 200.

Here, one or both of the first fastening hole 213 and the first step 214 are formed in each side of the metal frame 210, and then the mold frame 220 is arranged inside the metal frame 210 by injection molding. By forming the container member this way, the metal frame 210 can be more firmly coupled with the mold frame 220.

Figure 2B:
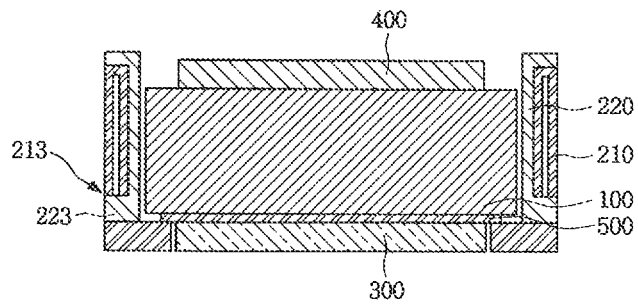
FIG. 2B is a cross-sectional view illustrating a modification of a container member in display device according to a first embodiment of the present invention.

Turning now to FIG. 2B, FIG. 2B shows a cross section of a display device according to a variation of the first embodiment of the present invention. In the container member 200 of FIG. 2B, the sides 212 of the metal frame 210 are folded in an inward direction, and thus have a hemmed structure, so that it is possible to further reinforce rigidity of the metal frame 210.

In the scenario where mold frame 220 is produced via a separate process and is then fastened to the metal frame 210 of FIG. 2B where the sides 212 of the metal frame 210 have the hemmed structure, an unnecessary space may be generated between the metal frame 210 and the mold frame 220 due to the hemmed structure. Consequently, it is preferable that the mold frame 220 is produced by injection molding when the metal frame 210 has sides 212 having a hemmed structure as in FIG. 2B.

Table 1 below shows the results of performing a drop test on the display device including the container member 200 having the metal frame 210 and the mold frame 220 located inside the metal frame 210, and particularly a structure (Type 1) in which the first opening 210a is formed in the bottom 211 of the metal frame 210, and thus the buffer tape 300 is located inside the first opening 210a, and a structure (Type 2) in which the first opening 210a is not formed in the bottom 211 of the metal frame 210, and thus the buffer tape 300 is interposed between the bottom 211 of the metal frame 210 and the display panel.

TABLE 1

|        | Deformation Jig | Rigidity Jig | Drop Result |
|--------|-----------------|--------------|-------------|
| Type 1 | 60.0            | 33.5         | 93.5        |
| Type 2 | 40.5            | 32.5         | 73.0        |

Here, a deformation jig for testing a degree of deformation and a rigidity jig for measuring a degree of damage caused by an impact were used for the drop test of the display device. A front drop and a bottom drop were each carried out ten times, and the score was given within a range of 0 to 5 points according to the degree of deformation or damage.

Referring to Table 1, the structure (Type 1) in which the first opening 210a is formed in the bottom 211 of the metal frame 210 got a relatively high score compared to the structure (Type 2) in which the first opening 210a is not formed in the bottom 211 of the metal frame 210. Thus, it could be concluded that the structure (Type 1) in which the first opening 210a is formed in the bottom 211 of the metal frame 210 relieved the external impact and stress in a relatively effective manner.

More specifically, in the case where the first opening 210a is not formed in the bottom 211 of the metal frame 210, i.e. in the case in which the bottom 211 of the metal frame 210 is located at a region corresponding to the display panel 100, the bottom 211 of the metal frame 210 vibrates upon external impact, thereby causing resonance with the buffer tape 300 located between the bottom 211 of the metal frame 210 and the display panel 100, and thus exacerbating the impact transmitted to the surface of the display panel 100. For this reason, the structure (Type 2), in which the first opening 210a is not formed in the bottom 211 of the metal frame 210, fails to efficiently relieve the external impact compared to the structure (Type 1) in which the first opening 210a is formed in the bottom 211 of the metal frame 210.

Consequently, the display device according to a first embodiment effectively absorbs and relieves the external impact using the container member having a space to accommodate the display panel and having a metal frame having the first opening formed in its bottom and the mold frame located between the metal frame and the display panel, thereby minimizing the deformation caused by the external stress.

Further, the display device according to a first embodiment is configured such that the buffer tape is located inside the first opening of the metal frame, and thus an entire thickness of the display device is reduced by a thickness of the bottom of the metal frame. As a result, the presence of the first opening 210a in the bottom 211 of the metal frame 210 serves not only to protect the display panel 100 within but also to reduce the total thickness of the display device.

Second Embodiment

Figure 3A:
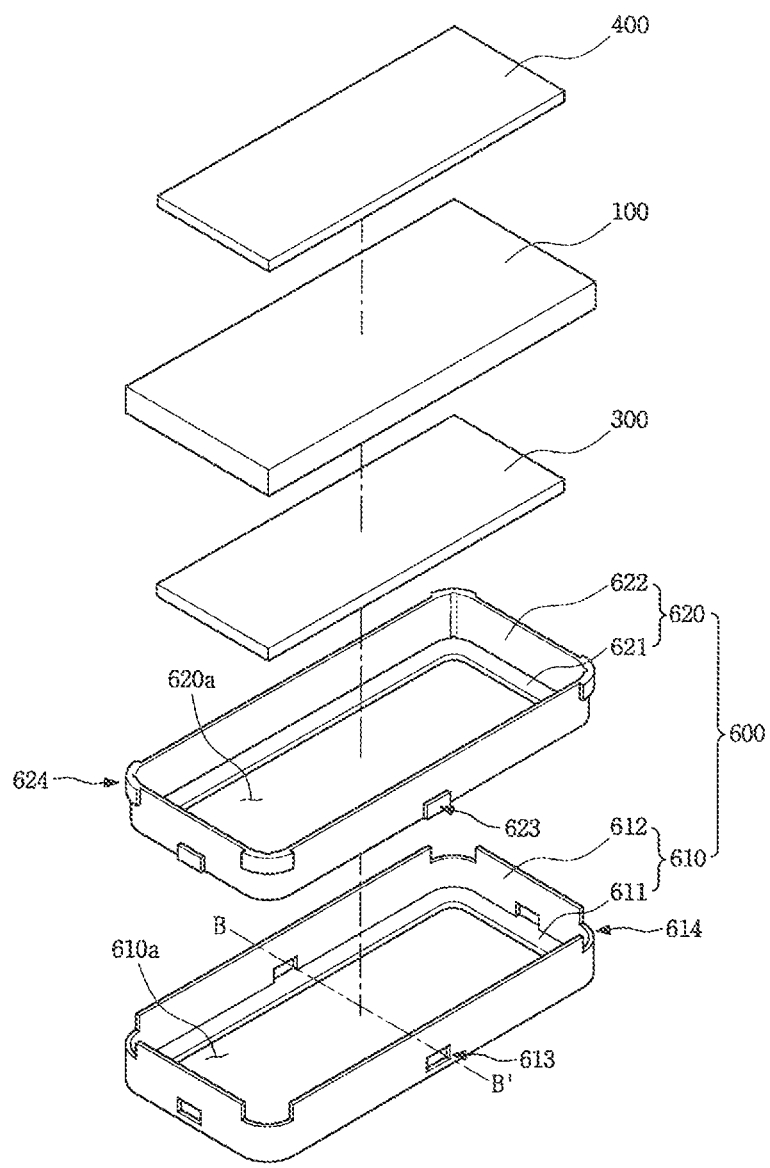
FIG. 3A is an exploded perspective view illustrating a display device according to a second embodiment of the present invention.
Figure 3B:
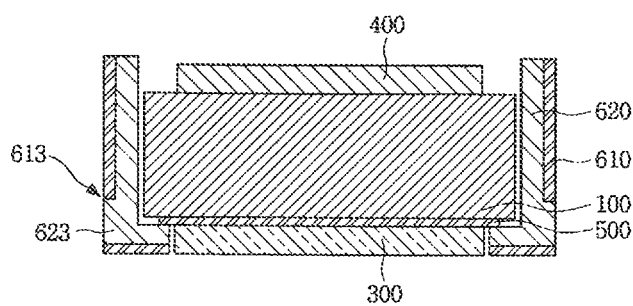
FIG. 3B is a cross-sectional view taken along line B-B' of FIG. 3A.

Turning now to FIGS. 3A and 3B, FIG. 3A is an exploded perspective view illustrating a display device according to a second embodiment of the present invention and FIG. 3B is a cross-sectional view taken along line B-B' of FIG. 3A. Referring to FIGS. 3A and 3B, the display device according to a second embodiment includes a display panel 100 for displaying a predetermined image; a container member 600 including a metal frame 610 having a space that accommodates the display panel 100 and having a bottom 611 with a first opening 610a, and a mold frame 620 located inside the metal frame 610, and a buffer tape 300 located inside the first opening 610a of the metal frame 610.

Similar to the aforementioned display device according to a first embodiment, the display device according to a second embodiment may further include a polarizer 400 located on one side of the display panel 100, and a double-sided tape 500 interposed between the display panel 100 and the buffer tape 300 and between the display panel 100 and the bottom 611 of the metal frame 610. The display panel 100 may be an OLED display panel having OLEDs.

The container member 600 is formed in such a manner that corners of the metal and mold frames 610 and 620 are chamfered, preferably rounded, to have a predetermined curvature. Here, the container member 600 of the display device according to a second embodiment is shown with the corners of the metal and mold frames 610 and 620 formed to have a predetermined curvature by a rounding process. Alternatively, the corners of the metal and mold frames 610 and 620 may be formed in any shape by a typical rounding process.

The container member 600 may be produced by forming the metal frame 610 and the mold frame 620 separately, then rounding the corners of the metal and mold frames 610 and 620, and then fastening the metal and mold frames 610 and 620 together. Another method of producing the container member 600 includes forming the metal frame 610 having the first opening 610a at the bottom thereof, rounding the corners of the metal frame 610, and then forming the mold frame 620 inside the metal frame 610 by injection molding. When the mold frame 620 is produced using injection molding where the metal frame 610 serves as the mold, the process of manufacturing the container member 600 is simplified, and the metal frame 610 is in close contact with the mold frame 620 so that the impact and stress caused by an external impact such as a drop impact can be more effectively relieved.

Further, similar to the aforementioned first embodiment, the container member 600 of the second embodiment may include at least one first fastening hole 613 located in each side 611 of the metal frame 610 and at least one first protrusion 623 located on each side of the mold frame 620 corresponding to the first fastening hole 613 such that the metal frame 610 may be firmly coupled to the mold frame 620.

The container member 600 may also include at least one first step 614 located on each side 611 of the metal frame 610 and at least one second protrusion 624 located on each side of the mold frame 620 corresponding to the first step 614. Specifically, the steps 614 of the metal frame 610 are located at corners of the metal frame 610 such that the metal frame 610 can be firmly coupled with the mold frame 620 regardless of a direction of the external impact applied to the metal frame 610.

In the display device according to a second embodiment, the mold frame 620 may include a bottom 621 having a second opening 620a having an area corresponding to that of the first opening 610a, and sides 622 contacting the sides 612 of the metal frame 610. In this case, the bottom 621 of the mold frame 620 has the same thickness as the double-sided tape (not shown) between the bottom 611 of the metal frame 610 and the display panel (not shown) such that an entire thickness of the display device is not increased due to the bottom 621 of the mold frame 620.

Further, when the bottom 621 of the mold frame 620 is located at portions of the display panel that correspond to the image producing display region, the mold frame 620 and the buffer tape are less apt to vibrate upon external impact because the mold frame 620 and the buffer tape are soft. However, since the display region of the display panel has a plurality of elements for displaying a predetermined image, slight damage to the display panel may reduce a contrast ratio and luminance of the image. As a result, the second opening 620a is designed to have a relatively large area compared to the first opening 610a, so that the bottom 621 of the mold frame 620 is not located at the region corresponding to the display region of the display panel.

Table 2 below shows the results of performing a drop test on the display device including the container member 600 having the metal frame 610 having the rounded corners and the mold frame 620 located inside the metal frame 610 according to the second embodiment of the present invention, and in particular a structure (Type 3) in which the first opening 610a is formed in the bottom 611 of the metal frame 610, and a structure (Type 4) in which the first opening 610a is not formed in the bottom 611 of the metal frame 610.

Here, the method of performing the drop test is the same as in the first embodiment, and so its description will not be repeated.

TABLE 2

|  | Deformation Jig | Rigidity Jig | Drop Result |
| --- | --- | --- | --- |
| Type 3 | 90.5 | 45.0 | 135.5 |
| Type 4 | 70.5 | 20.5 | 91.0 |

Referring to Table 2, the structure (Type 3) in which the first opening 610a is formed in the bottom 611 of the metal frame 610 got a relatively high scores compared to the structure (Type 4) in which the first opening 610a is not formed in the bottom 611 of the metal frame 610. Thus, it could be concluded that the structure (Type 3) in which the first opening 610a is formed in the bottom 611 of the metal frame 610 relieved the external impact and stress in a relatively effective manner.

Further, comparing the drop test results of the first embodiment with those of the second embodiment, it could be further concluded that both of the structure (Type 3) in which the first opening 610a is formed in the bottom 611 of the metal frame 610 and the structure (Type 4) in which the first opening 610a is not formed in the bottom 611 of the metal frame 610 had relatively high drop performance when the corners of the metal frame 610 were rounded as compared to the structure of type 1 and type 2 respectively where the corners were not rounded. Therefore, in addition to forming an opening in a bottom of a metal frame, rounding the corners of the metal frame served to further protect the display panel within the container member.

Consequently, the display device according to a second embodiment effectively absorbs and relieves the external impact using the container member, which provides the space for accommodating the display panel, includes the metal frame having the first opening formed in its bottom and the mold frame located between the metal frame and the display panel, and in which the corners of the metal frame are rounded, thereby minimizing the deformation to the display panel caused by the external stress.

Thus, both a container member, which has a metal frame providing a space that accommodates a display panel and having a bottom with a first opening and a mold frame interposed between sides of the metal frame and the display panel, and a display device having the container member prevents damage to a display panel during an assembly process using the container member, sufficiently reduces or eliminates impact transmitted to the display panel by an external impact such as a drop impact, and minimizes deformation of the display panel caused by an external stress, so that the container member may effectively protect display panel from damage.

Although a few embodiments have been shown and described, it would be appreciated by those skilled in the art that changes may be made in this embodiment without departing from the principles and spirit of the invention, the scope of which is defined in the claims and their equivalents.

What is claimed is:

1. A display device, comprising:
a display panel; and
a container member, the container member including:
a metal frame including a space that accommodates the display panel, a plurality of sides and a bottom having a first opening;
a mold frame arranged between the sides of the metal frame and sides of the display panel; and
a buffer tape arranged within the first opening of the metal frame, the buffer tape having a thickness equal to a thickness of the bottom of the metal frame.

2. The display device of claim 1, each of the sides of the metal frame includes at least one fastening aperture, the mold frame includes a plurality of sides, each of the sides of the mold frame includes at least one first protrusion arranged at a location that corresponds to the fastening aperture.

3. The display device of claim 1, each of the sides of the metal frame includes at least one step, the mold frame includes a plurality of sides, each of the sides of the mold frame includes at least one second protrusion arranged at a location that corresponds to the step.

4. The display device of claim 1, further comprising a double-sided tape arranged between the display panel and the bottom of the metal frame and between the display panel and the buffer tape to attach the buffer tape to the display panel.

5. The display device of claim 1, wherein the metal frame further includes a plurality of rounded corners, wherein each of the corners have a curvature.

6. The display device of claim 1, wherein each of the sides of the metal frame have a hemmed structure.

7. The display device of claim 6, wherein the mold frame is absent of a bottom and is produced by an injection molding process where the metal frame is used as part of the mold.

8. The display device of claim 1, the buffer tape being arranged only within the first opening, and the buffer tape covering an area of the display panel substantially equal to an entirety of the first opening.

9. The display device of claim 1, the mold frame having a bottom that is perforated by a second opening that corresponds to the first opening in the metal frame, the first and second openings being arranged on a side of the display panel where no image is produced or viewed and being opposite to a side of the display panel that displays and image.

10. A method of manufacturing a container member that accommodates a display panel, the method comprising:
providing a metal frame having a bottom and a plurality of sides, the bottom having a first opening, at least one fastening aperture in each of the sides and at least one step in each of the sides; and
forming a mold frame on inner sides of the metal frame by injection molding, wherein the metal frame serves as the mold during the injection molding process.

11. The method according to claim 10, the mold frame comprising
at least one protrusion on each side of the mold frame at a location that corresponds to the fastening aperture that is formed during said injection molding.

12. The method according to claim 11, the mold frame further comprising
at least one protrusion on each side of the mold frame at a location that corresponds to the step.

13. The method according to claim 10, further comprising rounding corners of the metal frame prior to said formation of the mold frame.

14. The method according to claim 10, further comprising producing a hemmed structure by folding the sides of the metal frame prior to said formation of the mold frame.

15. A display device, comprising:

a display panel to display an image;

a metal frame including a space that accommodates the display panel, a plurality of sides and a bottom having a first opening;

a mold frame arranged between the sides of the metal frame and sides of the display panel, the mold frame having a plurality of sides and a bottom having a second opening; and a buffer tape arranged within the first opening of the metal frame, wherein a size and location of each of the first and second openings correspond to a display region of the display panel and to a size and location of the buffer tape.

16. The display device of claim 15, wherein the metal frame includes at least one fastening aperture arranged in each of the sides, and the mold frame includes at least one first protrusion arranged on each side thereof to correspond to the fastening aperture.

17. The display device of claim 16, wherein the metal frame includes at least one step arranged in each of the sides, and the mold frame includes at least one second protrusion arranged on each side thereof to correspond to the step.

18. The display device of claim 15, wherein the sides of the metal frame have a hemmed structure.

19. The display device of claim 15, further comprising a double-sided tape arranged between the display panel and the bottom of the metal frame and between the display panel and the buffer tape, the double-sided tape to attach the buffer tape to the display panel.

20. The display device of claim 15, the display panel having a first side that includes a polarizer and displays the image, and a second side opposite to the first side that does not display any image, the first and second openings and the buffer tape being arranged on the second side of the display panel.

21. The display device of claim 15, the buffer tape being exposed to an outside of the display device.

* * * * *